United States Patent [19]
Coiner et al.

[11] 3,814,483
[45] June 4, 1974

[54] BLENDING VALVE DEVICE FOR COMBINING FLUID PRESSURE AND DYNAMIC BRAKES

[75] Inventors: Ronald W. Coiner, Irwin; Robert J. Bridigum, Pittsburgh; Donald Brown, Monroeville, all of Pa.

[73] Assignee: Westinghouse Air Brake Company, Wilmerding, Pa.

[22] Filed: May 22, 1973

[21] Appl. No.: 362,668

[52] U.S. Cl. .................................. 303/3, 303/22 R
[51] Int. Cl. .............................................. B60t 13/74
[58] Field of Search ............ 188/195; 303/3, 16, 20, 303/22 A, 22 R

[56] References Cited
UNITED STATES PATENTS

| | | | |
|---|---|---|---|
| 3,275,380 | 9/1966 | May | 303/3 |
| 3,536,360 | 10/1970 | Engle | 303/3 |
| 3,536,361 | 10/1970 | Engle | 303/3 |
| 3,692,365 | 9/1972 | Demarez et al. | 303/3 |
| 3,761,137 | 9/1973 | Green et al. | 303/3 |

*Primary Examiner*—Duane A. Reger
*Attorney, Agent, or Firm*—R. W. McIntire, Jr.

[57] ABSTRACT

A blending valve device subject to a brake command signal and a feedback signal representative of dynamic brake effort produced in response to said brake command signal, said signals acting in concert to rotate a control lever about an adjustable fulcrum for counteracting the effect of a control spring acting to rotate the lever in a direction to actuate a relay valve that provides fluid brake pressure according to the reduction of counteracting effect on the control spring, thereby affording fail-safe fluid brake operation for supplementing the dynamic brake. The adjustable fulcrum serves to vary the lever ratio of the control lever and may be operative responsive to variation in vehicle air spring pressure to accordingly vary the magnitude of fluid brake pressure with the vehicle load.

15 Claims, 2 Drawing Figures

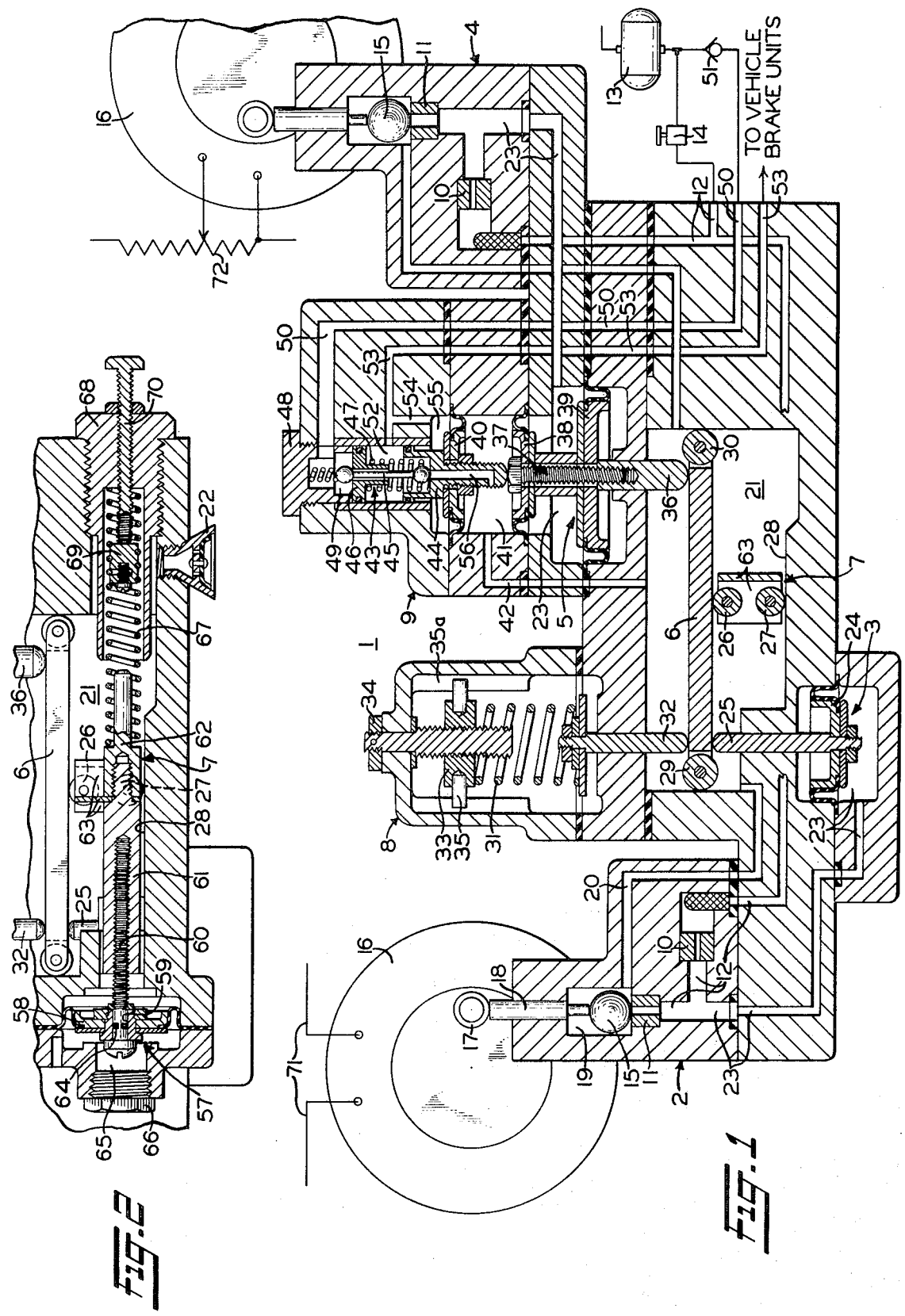

BLENDING VALVE DEVICE FOR COMBINING FLUID PRESSURE AND DYNAMIC BRAKES

BACKGROUND OF THE INVENTION

The present invention is concerned with providing a device for continuously regulating the air controlled friction brake obtained on railway transit vehicles in accordance with the brake command and the available dynamic brake effort obtained through regenerative operation of the vehicle's electric traction motors in such manner as to provide smooth blending of brake effort produced by the separate brake systems as the dynamic brake effort deviates from the brake command by reason of having an inherent time delay, surges in the dynamic brake load circuit, and a diminishing effectiveness or fade at the time of approaching a stop.

Previous devices for obtaining this continuous blending of the friction and dynamic brakes including electronic blending systems and more conventional means such as electric to pneumatic transducers have not proven entirely successful. In the former instance, cost, maintenance and reliability factors have precluded general acceptance; while in the latter case, equipment size, high power consumption, poor linearity and high hysteresis have been drawbacks thus far.

Systems developed prior to the advent of these continuous type blending valve systems, employed threshold switching of the air controlled friction brake to supplement the dynamic brake. Such arrangements responded to a predetermined level of dynamic brake effort to either disable the friction brake entirely or allow it to become fully effective. Obviously, this lack of continuous blending produces an uneven rate of retardation which is totally unacceptable in high speed rapid transit type service to which the present invention alludes.

SUMMARY OF THE INVENTION

It is therefore one object of this invention to provide a new friction/dynamic brake blending valve comprising transducer means operating on the pressure bleed control principle of varying output pressure to obtain fast response, good linearity and low operating force requirements conducive to development of an accurate, smaller and less costly brake control device.

It is another object of the invention to provide a new blending valve device, as above, having nearly total fail-sfe operation in keeping with the fail-safe brake concept introduced with the original automatic air brake.

Still another object of the invention is to provide a blending valve device employing a variable fulcrum scale beam for adjusting the effective brake control in accordance with the vehicle load.

Yet another object is to provide low friction relay valve means to minimize hysteresis in the output pressure in keeping with the fast response characteristic made possible by the bleed control concept of the first object.

Another object is that of arranging the relay valve control spring so as to drive the relay valve through the scale beam and accordingly reflect the vehicle load condition in the brake control at all times.

A final object is that of providing a blending valve, as above, which can be employed as a simple electric to pneumatic transducer when not subjected to a dynamic braking signal.

In accordance with the above objects there is provided a fulcrumed control lever acted upon at its one end by a fluid motor subject to the pilot pressure created between a pair of series related chokes via which a regulated source of fluid pressure flows to atmosphere. The downstream one of these chokes forms an exhaust valve seat with which a ball valve controlled by the output force of a torque motor cooperates to control the rate of bleed of pilot pressure to atmosphere, and thus the effective back pressure acting on the fluid motor to provide an electric to pneumatic transducer. The input of this transducer is a friction brake command signal, such as an analog signal generated in a current carrying train line wire, while the output varies in direct proportion therewith.

At the opposite end of the fulcrumed control lever is a self-lapping type relay valve whose operation is dictated by the effectiveness of a control spring that acts on the same side of the control lever as the fluid motor, but in direct opposition thereto so as to be under control of the friction brake transducer.

Interposed in this mechanical drive between the opposite end of the control lever and relay valve is a second fluid motor subject to pilot pressure created in accordance with the output of a second electric to pneumatic transducer identical to the first transducer, but whose input torque motor is driven by the effective dynamic brake current. This second fluid motor responds to the output of the dynamic brake transducer to counteract the effect of the friction brake transducer on the relay valve control spring in the brake application direction. That is, as long as the dynamic brake effectiveness is sufficient, the second fluid motor will act via the control lever to prevent the control spring from driving the relay valve irrespective of the effect of the first fluid motor on the control lever in accordance with the output of the friction brake controlling transducer. With reduced effectiveness of the dynamic brake in fulfilling the brake demand, however, the second fluid motor will exert less force on the relay valve control spring than the first fluid motor, accordingly allowing the friction brake transducer to influence control of the relay valve to provide friction brake effort for supplementing the dynamic brake to the extent of the dynamic brake ineffectiveness.

The load effect of the vehicle is reflected in the position of a roller comprising the control lever fulcrum which is moved between the ends of the control lever to vary its ratio in accordance with air spring pressure acting on a fluid motor to which the carriage supporting the roller is connected, so that the relay valve output pressure is modulated according to vehicle load.

In addition to the above objects, other advantages will become apparent from the following more detailed description of the invention with reference to the accompanying drawings in which:

FIG. 1 is a diagrammatic view showing a preferred embodiment of the blending valve device comprising the invention; and FIG. 2 is a broken away section of the blending valve device showing the mechanism for obtaining a vehicle load compensating brake control feature.

DESCRIPTION AND OPERATION

Referring now to FIG. 1 of the drawings, the blending valve device 1 comprises a friction brake transducer 2, a fluid motor 3 subject to the output fluid pressure of transducer 2, a dynamic brake transducer 4 identical to transducer 2, a fluid motor 5 subject to the output fluid pressure of transducer 4, a balance beam control lever 6 interposed between fluid motors 3 and 5, a fulcrum carriage mechanism 7 arranged to vary the effective ratio of control lever 6 in accordance with the load condition of the vehicle having the blending valve, drive means 8 acting on lever 6 in opposition to fluid motors 3 and 5, and a relay valve device 9 subject to the control force exerted by drive means 8 for providing the friction brake pressure required to produce friction brake effort to supplement the effective dynamic braking on the vehicle in obtaining the desired rate of vehicle retardation.

Transducers 2 and 4 are identical, each consisting of a pair of fluid flow restrictors 10 and 11, hereinafter referred to as supply and exhaust chokes, respectively. These chokes are arranged in series in a passageway 12 to which a source of fluid pressure is connected from a pressure maintained storage reservoir 13 via a pressure regulator device 14. The outlet orifice of exhaust choke 11 serves as a valve seat toward which a ball valve 15 is urged by the output force of a torque motor 16 acting through its output shaft 17 and a push pin 18 movably disposed in a guide bore in the valve casing between output shaft 17 and ball valve 15. Ball valve 15 is guidably disposed in a chamber 19 which is communicated with atmosphere via passageway 20, a chamber 21 housing fulcrum carriage mechanism 7, and a vent protector 22 (FIG. 2). A strainer in passageway 12 filters the air supply at a point upstream of supply choke 10 to assure a clean air supply, which normally bleeds to atmosphere via passageways 20 at a rate controlled by the proximity of ball valve 14 with the orifice of exhaust choke 11. The effective energization of torque motor 16 urging ball valve 15 in a downward direction is opposed by back pressure developed in a branch passageway and chamber 23 that communicates with passageway 12 between the series related chokes 10 and 11 to exert an upward fluid pressure force on ball valve 15, which is accordingly positioned in varying proximity with exhaust choke 11 when a force balance occurs, depending upon the degree of torque motor energization. At the point of force balance, the flow of fluid pressure exiting from exhaust choke 11 is exactly equal to the flow of fluid pressure supplied via supply choke 10. Consequently, the back pressure effective in passageway 12 is varied in direct relationship to the degree of energization of torque motor 16; and since the degree of rotation of the torque motor is limited to a range in which the vertical displacement of pin 18 by shaft 17 is substantially proportional to the degree of energization of the torque motor, the back pressure of the transducer is very nearly linear with the motor input current. When the torque motor current is subsequently increased, the resultant force imbalance on ball valve 15 will cause it to approach the exit orifice of exhaust choke 11 so that less air is vented and the back pressure accordingly increased until a force balance is again obtained in a new position of ball valve 15. Conversely, decreased torque motor current creates an imbalance in the opposite direction, allowing the back pressure to raise ball valve 15 and increase the air bleed with a corresponding decrease in back pressure resulting.

While the respective torque motors 16 are identical, torque motor 16 of transducer 2 is subject to brake command signals on a train line control wire 71 to which the motor terminals are connected, while torque motor 16 of transducer 4 is subject to the current generated by the vehicle traction motors (not shown) and expended by a dynamic brake grid 72 to which the motor terminals are connected.

Disposed in chamber 23 of transducer 2 is a diaphragm piston 24 having a stem 25, which together comprise fluid motor 3. Stem 25 extends into chamber 21 where it engages the underside of one end of lever 6, the fulcrum point of which is provided by a roller 26 of fulcrum carriage 7. Also mounted on carriage 7 along the vertical axis of roller 26 is a similar roller 27 that bears against a surface flat 28 of the valve casing to provide near friction free movement of the carriage in a direction to reposition roller 26 along the bottom bearing surface of lever 6 to vary its effective lever ratio. Each end of lever 6 is provided with additional rollers 29 and 30, which engage the end walls of chamber 21 to limit end-wise movement of lever 6 without adding any appreciable resistance to rocking motion about fulcrum roller 26.

Comprising drive means 8 is a main control spring 31 interposed between a pusher pin 32 that extends into chamber 21 for engagement with the one end of lever 6 at a point opposite stem 25 and a spring seat 33 that is threaded to receive an adjusting screw 34. A pair of diametrically opposed pins 35 are pressed into spring seat 33 in such a manner as to project into a pair of elongated slots 35a which restrict rotation of spring seat 33, while affording reciprocal movement thereof. Accordingly, spring seat 33 is only free to move in the direction of the slots when adjusting screw 34 is turned, thereby increasing or decreasing the tension of control spring 31, depending upon the direction of rotation of the adjusting screw.

Engageable with lever 6 at its other end is the stem 36 of a differential diaphragm type piston assembly 37 comprising fluid motor 5. Piston assembly 37 includes a smaller piston 38 interconnected in spaced-apart relation with a larger piston 39 to form therebetween the chamber 23 of dynamic brake transducer 4, the back pressure of which exerts a downward force on stem 36 and thus on lever 6. The fact that pistons 38 and 39 are of diaphragm type construction to eliminate friction requires that a differential type construction be employed with the effective area of smaller piston 38 substracting from the effective area of the larger piston 39 so that the net effective area of this differential piston assembly 37 agrees with the effective area of diaphragm piston 24 of fluid motor 3.

Diaphragm piston 38 cooperates with a diaphragm piston 40 to form an exhaust chamber 41 that is communicated with chamber 21 via passageway 42. Arranged for operation responsive to movement of piston 40 is a conventional self-lapping valve assembly 43, which together with piston 40 comprises relay valve device 9. Assembly 43 includes an exhaust valve seat member 44 connected with piston 40, an integral "barbell" type supply and exhaust valve member 45, and a supply valve seat member 46 that is urged by a spring 47 situated between the supply and exhaust valve seat members into continuous engagement with a screw plug 48 via which the valve assembly is made. Connected to a chamber 49 above supply valve seat member 46 is a passageway 50 subject to fluid pressure supplied from storage reservoir 13 via one-way check valve 51. Fluid pressure communication between a delivery chamber 52 formed between valve seat members 44, 46 and supply chamber 49 is controlled by the supply end of "barbell" 45. A passageway 53 leading to delivery chamber 52 is provided with a branch passageway 54 that leads to a compensating chamber 55 above diaphragm piston 40 to provide the internal feedback means for obtaining the relay valve self-lapping action. Fluid pressure communication between delivery chamber 52 and exhaust chamber 41 is provided by a drilled port 56 of exhaust valve member 44 and piston 40 and controlled by the exhaust end of "barbell" 45.

Referring now to FIG. 2, fulcrum carriage mechanism 7 includes a fluid motor 57 comprising a diaphragm type piston abutment 58 having a bore 59 in which is disposed the shank end of a screw 60. A member 61 is arranged with screw threads to receive the threaded portion of screw 60. A reduced end section of member 61 is provided with threads to receive a lock nut 62 which secures a U-shaped bracket 63 to member 61. Bracket 63 extends between lever 6 and bearing surface 28 where it carries rollers 26 and 27 for engagement therewith. An O-ring 64 surrounds the shank of screw 60 to provide a seal against fluid pressure leakage along the screw shank from a pressure chamber 65 formed between piston abutment 58 and a removable plug 66 in the valve casing.

In addition to securing bracket 63, nut 62 serves as a spring seat and guide for a spring 67 that is located between nut 62 and a plug 63 that is screw threaded into the body of blending valve device 1. Spring 67 thus urges fluid motor 57 in a direction opposing the force of pressure in chamber 65, which can, for example, be supplied from the vehicle air spring (not shown). A spring nut 69 having helical threads along its periphery corresponding in shape and pitch to the coils of spring 67 when in its free state is threaded into the spring a varying distance where it is engaged by an adjusting screw 70 that is in turn threaded through plug 68. The selected position of spring nut 69 relative to the spring coils determines the active number of coils and therefore the pickup rate of spring 67, while adjusting screw 70 controls the initial degree of compression of the active spring coils.

In operation let it be assumed that a brake release command is in effect, so that in keeping with a fail-safe mode of operation, torque motor 16 of transducer 2 is fully energized from control wire 71. Accordingly, ball valve 15 effects maximum restriction of air bleed at choke 11 under the influence of the fully energized torque motor to create maximum back pressure in passageway and chamber 23 associated with fluid motor 3. It will be appreciated that in the absence of a brake command, the vehicle's dynamic brakes are inactive and therefore no current flows in dynamic brake grid resistor 72. Accordingly, torque motor 16 of transducer 4 is deenergized so that a minimum of back pressure is reflected in passageway and chamber 23 associated with fluid motor 5. Fluid motor 3 therefore is effective to rotate lever 6 in a clockwise direction about fulcrum roller 26 in opposition to spring 31 of drive means 8. This permits any fluid pressure effective in delivery chamber 52 of relay valve device 9 to move piston 40 and piston assembly 37 downward, at the same time moving exhaust seat member 44 away from the exhaust valve of "barbell" member 45 to vent output pressure in passageway 52 to atmosphere via chamber 52, the unseated exhaust valve, drilled port 56, chamber 41, chamber 21 and vent protector 22. Whenever complete venting of output pressure in passageway 52 connected to the vehicle friction brake units is obtained, spring 47 holds piston 40 in its downward position to maintain full release of the friction brakes.

When a brake application is subsequently called for, torque motor 16 of transducer 2 is deenergized an amount corresponding to the desired degree of brake application, so that the back pressure effective between chokes 10 and 11 is able to raise ball valve 15 and thereby increase the fluid pressure bleed via choke 11. The resulting back pressure effective in passageway and chamber 23 associated with fluid motor 3 is accordingly decreased, as is the force exerted on lever 6 by stem 25. Concurrently, however, the vehicle's dynamic brake current generated by the vehicle's traction motors to absorb the kinetic energy of the vehicle is expended in the form of heat at the dynamic brake grid 72. This regenerative current results in torque motor 16 of transducer 4 becoming energized to produce a back pressure control signal in passageway and chamber 23 thereof corresponding to the degree of dynamic brake effort in effect. In that this fluid pressure in chamber 23 acts on fluid motor 5, differential piston assembly 37 is forced in a downward direction that tends to effect clockwise rotation of lever 6 in opposition to spring 31 of drive means 8. The force exerted on lever 6 by spring 31 acting through stem 25 is therefore counteracted an amount corresponding to the dynamic brake effectiveness, even though the force exerted on lever 6 by transducer 2 acting through stem 25 is relaxed in accordance with the degree of brake command called for. If the brake effort produced by the dynamic brake is sufficient to satisfy the brake command, then the counteracting force of fluid motor 5 on lever 6 will completely nullify the action of spring 31 and the friction brakes will remain released.

In the event the dynamic brake effort is diminished (as for example in approaching a stop) so that the degree of energization of torque motor 16 of transducer 4 relaxes the force exerted on lever 6 via stem 36 of fluid motor 5 below a value corresponding to the brake command respresented by the force exerted on lever 6 by stem 25 of fluid motor 3, transducer 2 acting through stem 25 will then become effective to establish the degree of friction brake application force exerted on lever 6 by spring 31 acting through pin 32. The maximum application force available is determined by the preadjusted tension of spring 31 as provided for by adjusting screw 34. Accordingly, lever 6 will be rocked in a counterclockwise direction by spring 31 and will act through stem 36 and valve assembly 37 of fluid motor 5 to operate relay valve device 9 to application position. As piston 40 of relay valve 9 is lifted upward, seat member 44 engages the exhaust valve end of "barbell" 45, which at the same time lifts the supply valve end off of seat member 46. Supply fluid pressure from reservoir 13 is thus connected via check valve 51, passageway 50, past the open supply valve to chamber 52 and thence by way of passageway 53 to the vehicle brake units which become effective to produce friction brake effort to supplement the brake effort produced by the dynamic brake. Feedback of this brake pressure is connected from passageway 53 to branch passageway 54 and chamber 55 where it acts on piston 40 in opposition to the upward acting force thereon exerted by lever 6. When the opposing forces acting on piston 40 are substantially balanced, relay valve spring 47 restores piston 40 to a position in which the exhaust and supply valve ends of "barbell" 45 are engaged with their respective seats, thereby lapping off any further supply of fluid pressure to the vehicle brake units. Consequently, the friction brake effort produced supplements the dynamic brake effort to the extent necessary to satisfy the brake command called for, and lever 6 is maintained in a force balanced condition.

Should the force balance of lever 6 be upset, due for example to a change in the brake command called for, or a change in the effective effort of the dynamic brake, lever 6 will be rocked either in a counterclockwise direction to increase friction brake pressure or in a clockwise direction to release friction brake pressure until a force balance is restored, so that the blending action of the respective brakes governing vehicle retardation is smooth and continuous.

From the above, it will be understood that in the absence of any dynamic brake signal whatsoever, full friction brake effort will result. To this end, it will be evident therefore that blending valve device 1 less dynamic brake transducer 4 may be utilized as a straight electric to pneumatic transducer, if desired.

It is axiomatic, of course, that the position of fulcrum roller 26 relative to lever 6 establishes the lever ratio and consequently the desired relationship between the brake command called for and the degree of friction brake required to supplement the dynamic brake when the latter fades. Fulcrum roller 26 may be positioned along lever 6 in accordance with variations in the vehicle air spring pressure so that the lever ratio and therefore the friction brake effort varies with the vehicle load. The air spring pressure of the vehicle is effective in chamber 65 where it acts on piston abutment 58 in opposition to spring 67, the tension of which is adjusted by screw 70 acting against spring nut 69 in accordance with the desired minimum air spring pressure that will cause movement of fulcrum carriage 7. Subsequent adjustment of screw 60 will now change the axial position of fulcrum carriage 7 so that the position of roller 7 along lever 6 will dictate the empty condition lever ratio and thus the friction braking pressures available for supplementing the dynamic brake. With increased vehicle leading, the resulting higher air spring pressure will move fulcrum carriage 7 against spring 67 to shift roller 26 in a rightward direction along lever 6. This adjusts the lever ratio such as to increase the net effective friction brake pressure available for supplementing the dynamic brake. Due to the many design parameters of transit vehicles, it is evident that different air spring pressure ranges must be accommodated in automatically selecting the proper load modified friction brake pressures. This requirement is met by this adjustment of spring nut 69, the position of which may be changed by winding along the coils of the spring to thereby vary the active number of the coils and accordingly determine the spring pick-up rate. During adjustment of fulcrum carriage 7 responsive to the above settings and varying air spring pressures, roller 27 acting in conjunction with roller 26 provides near friction free movement of fulcrum carriage 7 to assure accurate selection of the lever ratio. Should a malfunction occur to cause loss of air spring pressure effective in chamber 65, spring 67 will be effective to shift fulcrum carriage 7 to its extreme leftward position to adjust the ratio of lever 6 for empty friction brake pressure and thereby safeguard against undesirable wheel slip.

Furthermore, spring 31 of drive means 8 provides for a mechanical force application that is controlled by fluid pressure motors 3 and 5 acting through lever 6 so that loss of fluid pressure control will result in spring 31 becoming increasingly effective to assure a fail-safe friction brake application consistent with the vehicle load condition, as established by the effective ratio of lever 6, and the effectiveness of the dynamic brake.

Having now described the invention, what we claim as new and desire to secure by letters Patent, is:

1. A control valve device for regulating fluid brake pressure on a railway vehicle having a dynamic brake operative responsive to a brake command signal, said valve device comprising:
   a. a control lever having an adjustable fulcrum member intermediate its ends about which rotation of said lever occurs;
   b. means responsive to the load condition of said vehicle by varying the position of said fulcrum member along said lever so that the ratio thereof changes in accordance with the vehicle load condition;
   c. power means for exerting a first moment on said lever to effect rocking thereof in one direction from a neutral position;
   d. first and second means responsive respectively to said brake command signal and the effective brake effort produced by said dynamic brake for counteracting said power means;
   e. valve means operative responsive to rocking of said lever in said one direction for increasing said fluid brake pressure in accordance with a reduction of counteracting effect on said power means.

2. The device as recited in claim 1, further characterized in that said power means and said valve means are engageable with said lever at opposite sides of said fulcrum member whereby said fluid brake pressure reflects the load condition of said vehicle over the full range of said brake command signal.

3. The device as recited in claim 1, wherein said first and second means each comprise:
   a. a bleed valve assembly including:
      i. a pair of series related fluid flow restrictors via which a source of regulated fluid pressure is vented;
      ii. a ball valve cooperating with the orifice of the downstream one of said restrictors by reason of its proximity with said orifice to vary the rate of flow thereat; and
   b. electrically controlled input means for controlling the proximity of said ball valve with said orifice to obtain back pressure intermediate said restrictors that varies in magnitude with the degree of control of said input means; and
   c. fluid motor means operative responsive to variations in the magnitude of said back pressure for exerting second and third moments respectively on said lever to provide said counteracting effect on said power means.

4. The device as recited in claim 3, further characterized in that said fluid motor of said second means is interposed between said valve means and said lever at the side of said fulcrum member opposite the side subject to said power means.

5. The device as recited in claim 4, wherein said valve means comprises a valve assembly including a feedback fluid motor via which said valve assembly is actuated to application position in response to rocking of said lever in said one direction to connect a source of fluid pressure to the output of said valve device to provide said fluid brake pressure, said feedback fluid motor being subject to said fluid brake pressure whereby said feedback fluid motor and said fluid motor of said second means act in tandem to provide said third moment.

6. The device as recited in claim 5, further characterized in that said feedback fluid motor and said fluid motor of said second means comprise diaphragm type piston abutments, the latter being of the differential type.

7. The device as recited in claim 3, further characterized in that said electrically controlled input means comprises a torque motor, the output shaft of which is rotatable through a predetermined torque angle in which the magnitude of said back pressure is varied substantially linearly with the degree of control of said input means.

8. The device as recited in claim 1, further characterized in that said power means comprises a spring for exerting a constant force on said lever when said lever is in said neutral position to provide said first moment.

9. The device as recited in claim 1, further characterized in that said lever is confined within the end walls of its operating chamber by roller means affixed at each end of said lever for engagement with said end walls to limit axial movement of said lever relative to said fulcrum member without restricting rocking of said lever.

10. The device as recited in claim 1, further comprising:
   a. fluid motor means subject to a control fluid pressure that is automatically varied with changes in the load of said vehicle;
   b. a carriage connected to said fluid motor for supporting said fulcrum member along said lever between the one surface thereof and a bearing surface of the valve casing; and
   c. spring means acting on said carriage to bias said fluid motor in opposition to said control pressure so that the position of said fulcrum member along said lever is automatically adjusted with variations in the load of said vehicle to accordingly adjust said fluid brake pressure.

11. The device as recited in claim 10, further comprising first screw means for adjusting the tension of said spring means in accordance with a predetermined minimum value of said load responsive control pressure corresponding to an empty condition of said vehicle.

12. The device as recited in claim 11, further comprising second screw means for adjustably connecting said fluid motor and said carriage to provide selective positioning of said fulcrum member along said lever and thereby obtain variable selection of said lever ratio for a given value of said load responsive control pressure.

13. The device as recited in claim 12, wherein said spring means comprises:
   a. a helical spring having a plurality of coils; and
   b. a member having helical grooves in which the coils of said spring are engageable for winding the helical spring onto said member, thereby varying the number of active spring coils and accordingly adjusting the spring characteristic so that movement of said fulcrum member along said lever responsive to different ranges of said load responsive control pressure extends to limits defining predetermined minimum and maximum ratios of said lever.

14. A blending valve device for a railway vehicle having a dynamic brake operative responsive to a brake command signal, said blending valve device comrrising:

a. a control lever having a pivot point about which the lever is rotatable;
   b. spring means for exerting a continuous output force of a predetermined magnitude on said lever urging rotation thereof in one direction from a neutral position;
   c. first and second transducer means subject respectively to said brake command signal and a signal representative of the dynamic brake effort of said vehicle, each of said transducer means comprising:

i. a bleed valve assembly including:
         1. a pair of chokes in series via which a source of regulated fluid pressure continually bleeds to atmosphere;
         2. a ball valve arranged to cooperate with the downstream one of said chokes to control the rate of said fluid pressure bleed thereat;
      ii. electrical input means for controlling the proximity of said ball valve with said downstream one of said chokes whereby said bleed rate and accordingly the back pressure effective intermediate said chokes is varied; and
      iii. fluid motor means subject to said back pressure for urging rotation of said lever in a direction opposite said one direction; and d. valve means operative responsive to rotation of said lever in said one direction for providing fluid brake pressure to supplement said dynamic brake an amount depending upon the amount of brake effort said dynamic brake is deficient in satisfying said brake command signal.

15. The device as recited in claim 14, further characterized in that said pivot point is automatically positioned along said lever to adjust the ratio thereof in accordance with the load condition of said vehicle.

* * * * *